US007753777B1

(12) United States Patent
Giuffria et al.

(10) Patent No.: US 7,753,777 B1
(45) Date of Patent: Jul. 13, 2010

(54) DEVICE AND METHOD FOR CONDUCTING A GAME OF CHANCE

(76) Inventors: Gregg Giuffria, 8616 Scarsdale Dr., Las Vegas, NV (US) 89117; Terry Plourd, 6509 Peppermill Dr., Las Vegas, NV (US) 89146

( * ) Notice: Subject to any disclaimer, the term of this patent is extended or adjusted under 35 U.S.C. 154(b) by 701 days.

(21) Appl. No.: 11/649,677

(22) Filed: Jan. 3, 2007

(51) Int. Cl.
*G06F 17/00* (2006.01)

(52) U.S. Cl. ........................................................ 463/20

(58) Field of Classification Search .............. 463/16–25
See application file for complete search history.

(56) References Cited

U.S. PATENT DOCUMENTS 4,712,799 A 12/1987 Fraley
4,760,388 A 7/1988 Tatsumi et al.
4,800,376 A 1/1989 Suga et al.
5,788,573 A 8/1998 Baerlocher et al.
5,882,261 A 3/1999 Adams
6,254,481 B1 7/2001 Jaffe
6,315,666 B1 11/2001 Mastera et al.
6,569,018 B2 5/2003 Jaffe
6,960,134 B2 * 11/2005 Hartl et al. .................... 463/20
2006/0003827 A1 * 1/2006 Hartl et al. ..................... 463/9
2006/0009277 A1 * 1/2006 Hartl et al. .................... 463/20
2006/0073886 A1 * 4/2006 Tempest et al. ............... 463/27
2008/0161094 A1 * 7/2008 Tempest et al. ............... 463/20
2009/0117987 A1 * 5/2009 Novero et al. ................. 463/20
2009/0124335 A1 * 5/2009 Watkins et al. ................ 463/20

FOREIGN PATENT DOCUMENTS

GB 0449433 A3 10/1991

* cited by examiner

*Primary Examiner*—Ronald Laneau
(74) *Attorney, Agent, or Firm*—Morishita Law Firm LLC; Robert Ryan Morishita

(57) ABSTRACT

A method and device for conducting a multi-reel slot game includes a primary game display showing rotating reels carrying reel indicia and a secondary game display showing an array of target indicia, one or more of which may be associated with a secondary award. An outcome of the multi-reel slot game may trigger a non-reel game interaction directed to selecting target indicia from the secondary game display. Optionally, the non-reel game interaction includes a reel indicium thrown from a primary game display to a secondary game display where any target indicium struck is selected. Optionally, any target indicia connected to the selected target indicium are also selected. Any secondary award associated with selected target indicia is issued. Optionally, a supplemental non-reel game interaction may be triggered by selected target indicia. Optionally, the secondary game display is revised through removal, rearrangement, and/or replenishment of target indicia.

47 Claims, 11 Drawing Sheets

DEVICE AND METHOD FOR CONDUCTING A GAME OF CHANCE

FIELD OF THE INVENTION

The present invention relates to gaming devices. More specifically, the present invention includes a device and a method for conducting a multi-reel slot game with separate display components to display interactions between the separate display components.

BACKGROUND OF THE INVENTION

Multi-reel slot games continue to attract growing numbers of gamblers in casinos worldwide. Such slot machines matured over the years. Formerly, slot machines utilized stepper motor reels, featured three vertical reels, each displaying three symbols, and rewarded the player based solely on the symbols displayed on the center horizontal row. Today's slot machines typically use computer-controlled graphics to generate virtual rotating reels, use five or more reels, and potentially examine and reward the player based upon hundreds of paylines displayed in a 3×5, or greater, array of electronically-generated symbols.

Bonus games, also referred to as secondary games, have likewise changed the look of multi-reel slot machines, often utilizing theme based animations to capture the interest of the player and keep him or her gambling. Many games have multiple bonus games, each generating a different look and feel, in order to provide the player multiple outcomes to watch for.

Multi-reel slot machines have also added secondary game display devices, often in the nature of top box devices sitting atop the standard game console. Such devices permit the integration of themed or other bonus action, the outcome of which may be integrated into the basic game, or secondary games. However, while the results may be integrated, the action portrayed by the secondary game display device is generally independent of that of the primary game display.

SUMMARY OF THE INVENTION

The present invention includes a method and device for conducting a game of chance. An optional embodiment of a device for conducting a game of chance includes a processor and a display in communication with the processor. Optionally, the display includes a primary game display component adapted to display a plurality of reels. In such an optional embodiment, each reel includes reel indicia such that the reel indicia displayed on the reels produce an outcome. At least one of the possible outcomes triggers a non-reel game interaction. For example, in an optional embodiment, the outcome associated with a non-reel game interaction includes the display of a reel indicia associated with the non-reel game interaction in a display position on at least one of the reels.

The display further includes a secondary game display component physically distinct from the primary game display component. In an optional embodiment, the primary game display component and secondary game component contemporaneously display a primary game display and a secondary game display. The secondary game display component is adapted to display a plurality of target indicia selectable by the non-reel game interaction. Optionally, the target indicia are segregated into subsets, with each subset associated with one of the reels in the primary game display. A data storage also communicates with the processor. The data storage stores at least a secondary game schedule associating at least one of the target indicia with at least one secondary award, at least one non-reel game interaction at least partially related to an outcome, and instructions executable by the processor for executing a method according to an optional embodiment of the present invention.

In one optional embodiment, a method may include controlling the primary game display component to produce an outcome. In an optional embodiment, displaying the outcome comprises selecting and displaying at least one reel indicium at each reel indicium location of the primary game display component. In one optional embodiment, the primary game display component displays the plurality of reels in a matrix of reel indicium locations and at least one payline consisting of a plurality of the reel indicium locations is defined such that the outcomes are produced by combinations of reel indicia displayed along the paylines. Optionally, the outcome is produced in response to receipt of a wager. In one such optional embodiment, the wager is allocated to one or more paylines to thereby activate one or more paylines, and outcomes are combinations of reel indicia along activated paylines. In an optional embodiment, a primary game schedule is defined to associate at least one of the outcomes with at least one primary award. In such an optional embodiment, the outcome is compared to the primary game schedule and the associated primary award, if any, is issued.

If the outcome is associated with a non-reel game interaction, the associated non-reel game interaction determined by the outcome is displayed on the primary game display component and the secondary game display component. If the non-reel game interaction results in the selection of at least one target indicium in the secondary game display component, the secondary award, if any, associated with the selected target indicium is issued.

Non-reel game interactions may take any form. In one optional embodiment, the non-reel game interaction includes an animation of a reel indicium depicting the reel indicium traveling off the reels in the primary game display component to the secondary game display component to interact with the target indicia. In one such optional embodiment, the device may include a connective game display component physically distinct from at least one of the primary game display component and the secondary game display component, adapted to display the non-reel game interaction between the primary game display component and the secondary game display component. For example, in one such optional embodiment, the reel indicium associated with the non-reel game interaction may be animated to travel off the reels of the primary game display component and traverse the connective game display component to appear on the secondary game display component. One implementation could include an optional embodiment in which at least one of the reel indicium that triggers a non-reel game interaction is displayed as an arrow directed toward the secondary game display component. In such an optional implementation, the reels of the primary game display component are displayed rotating towards the secondary game display component. Upon an outcome including at least one of the reel indicia displayed as an arrow, an animation of the reel indicia is displayed in which the reel indicium to strike at least one of the target indicia to select any target indicia struck.

In another optional embodiment, the non-reel game interaction is displayed as an animation depicting an additional indicium, separate from the reel indicia, appearing on the secondary game display component to interact with the target indicia. In one such optional embodiment, the additional indicium appearing on the secondary game display is animated to strike at least one of the target indicia to select any target indicia struck.

In yet another optional embodiment, the non-reel game interaction includes an animation that changes the visual appearance of the reel indicium while the reel indicium is stationary on the reel.

In an optional embodiment, a target indicium may be connected to zero or more other target indicia, so that selection of a target indicium additionally results in the selection of any target indicia connected to the selected target indicium. Connections may be based on many different factors including connecting target indicia that are adjacent, connecting target indicia having a common display attribute, and the like. In one example, target indicia are arranged such that any target indicium having a common display attribute are connected to all adjacent indicia.

Secondary awards could take many forms. For example, where wagers are received in the form of game credits, the secondary awards on the secondary game schedule may include a quantity of game credits. In another example, the secondary awards on the secondary game schedule stored at the data storage may include at least one free spin in which the game is conducted without requiring receipt of a wager. Optionally, the secondary awards associated with target indicia are concealed until the selection of a target indicium resulting in awarding of a secondary awards.

Optionally, the secondary game display component is revised. Revising could take many different forms, including removing, rearranging, replacing, and/or replenishing target indicia. For example, in one optional embodiment, the secondary game display component is revised by removing selected target indicia. Optionally, the secondary game display component may also be replenished in addition to any revising. For example, in an optional embodiment, a secondary game display component may be replenished by at least one of: adding target indicia, rearranging target indicia, replacing target indicia, and replacing one or more secondary awards associated with one or more target indicia.

In an optional embodiment, the device includes a game input device and the replenishing is conducted in response to receipt of a replenishment request at the game input device. In another optional embodiment, at least one non-reel game interaction is associated with the triggering of a replenishing so that a replenishment is conducted in response to an outcome triggering the non-reel game interaction associated with the replenishing. For example, in one such optional embodiment, target indicia at the secondary game display component are arranged in at least two rows with one row proximal to the primary game display component and one row distal to the primary game display component. At least one target indicium in the distal row is associated with the replenishing so that a selection of a target indicium in that distal row may trigger a replenishing.

In another example, each non-reel game interaction is associated with a replenishing in which a pattern of movement is defined in the secondary game display component. All target indicia previously selected are removed to produce empty target indicia locations. Remaining target indicia are rearranged by moving target indicia adjacent to empty target indicium locations along the pattern of movement. The rearrangement is repeated until no target indicia can be moved to an empty target indicium location along the pattern of movement and new target indicia are added into empty target indicia locations.

In an optional embodiment, the secondary game display persists over a series of two or more games. In one such optional embodiment, the secondary game display component is displayed as it appeared in a preceding game, including any revisions in the secondary game display component performed in the preceding game. At least one subsequent game is conducted by displaying reel indicia on the reels in the primary game display component to produce an outcome. If the outcome includes a display of reel indicia triggering at least one non-reel game interaction, the triggered non-reel game interactions determined by the outcome are displayed at the primary game display component and secondary game display component. If any triggered non-reel game interaction results in the selection of at least one target indicium in the secondary game display component, the secondary game display component may be revised and a secondary award, if any, associated with the selected target indicium may be issued.

In an optional embodiment, the device may further include a supplemental secondary game display component distinct from the primary game display component and the secondary game display component. In such an optional embodiment, the supplemental secondary game display component is adapted to display a plurality of supplemental target indicia selectable by a supplemental non-reel game interaction. the supplemental non-reel game interaction may be triggered in any manner. For example, in one such optional embodiment, a supplemental non-reel game interaction may be triggered, at least partially, by a non-reel game interaction. Upon triggering, the supplemental non-reel game interaction is displayed on the supplemental secondary game display component and, if a supplemental target indicium is selected, any supplemental award associated with that supplemental target indicium is issued.

BRIEF DESCRIPTION OF THE DRAWINGS

FIG. 4C is a front view of a portion of the secondary game display shown in

FIG. 4A following a non-reel game interaction;

DESCRIPTION

Figure 1A:
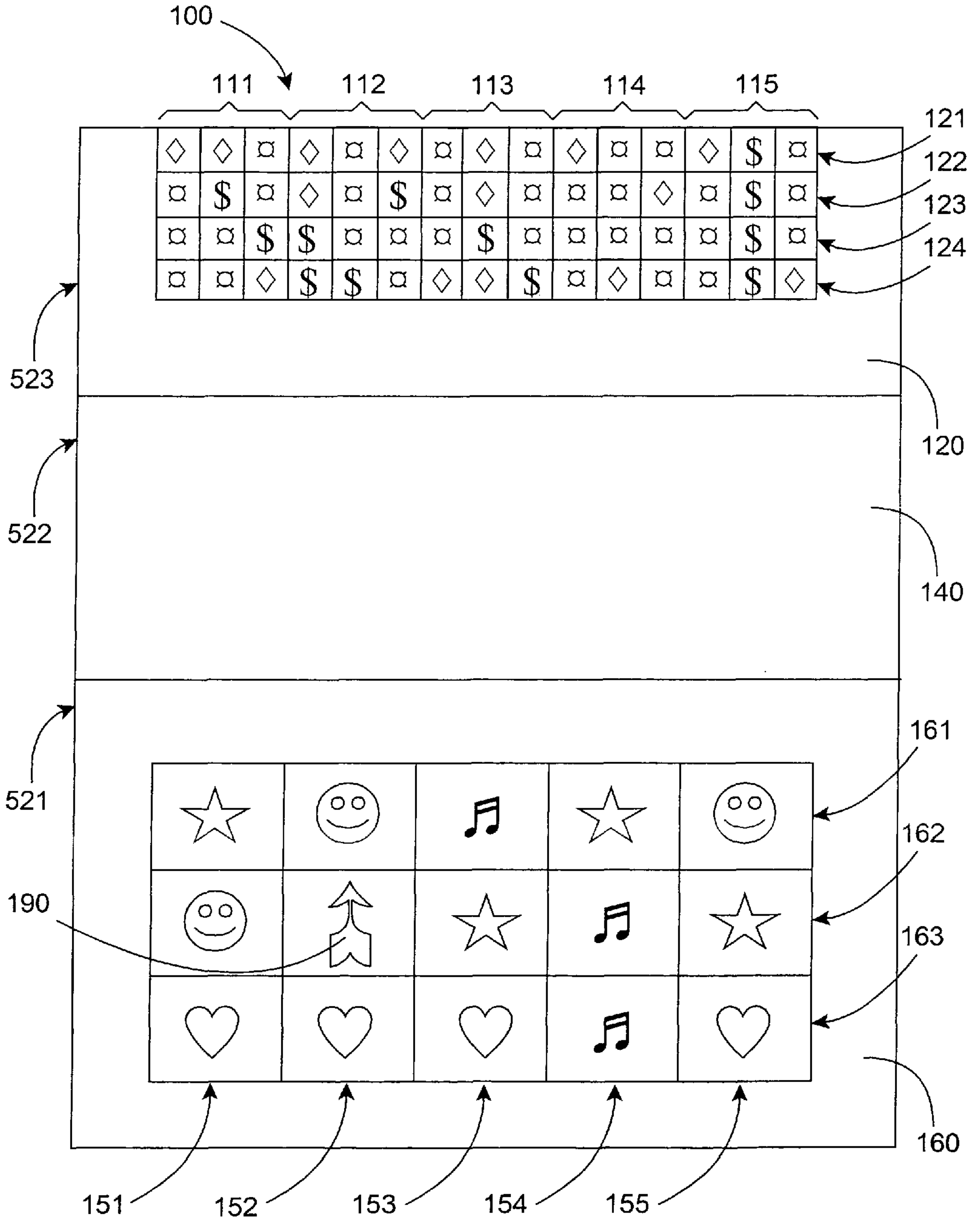
FIG. 1A is a front view of a display of a game according to an embodiment of the present invention.
Figure 1B:
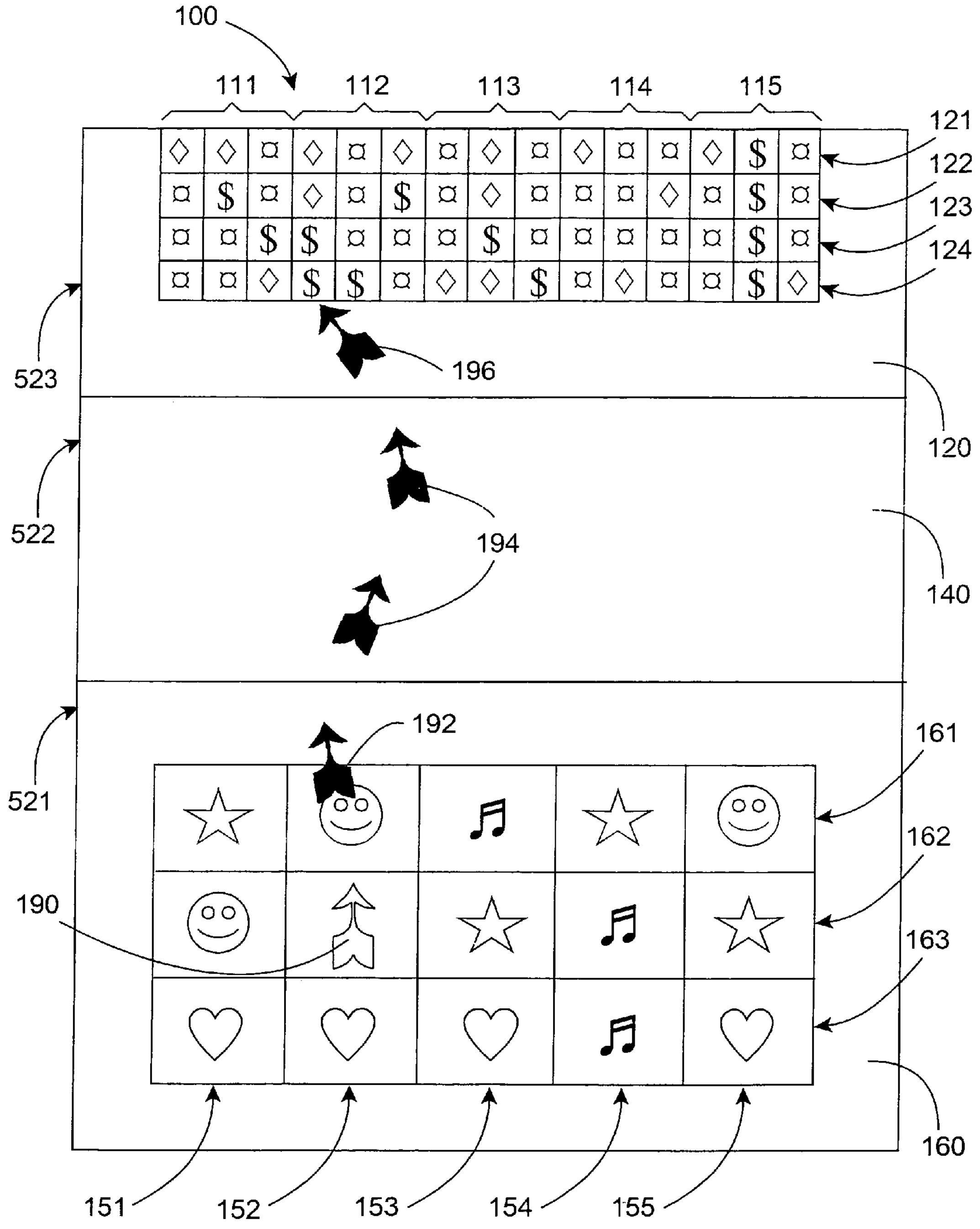
FIG. 1B is a front view of a display of a game according to an embodiment of the present invention.
Figure 2:
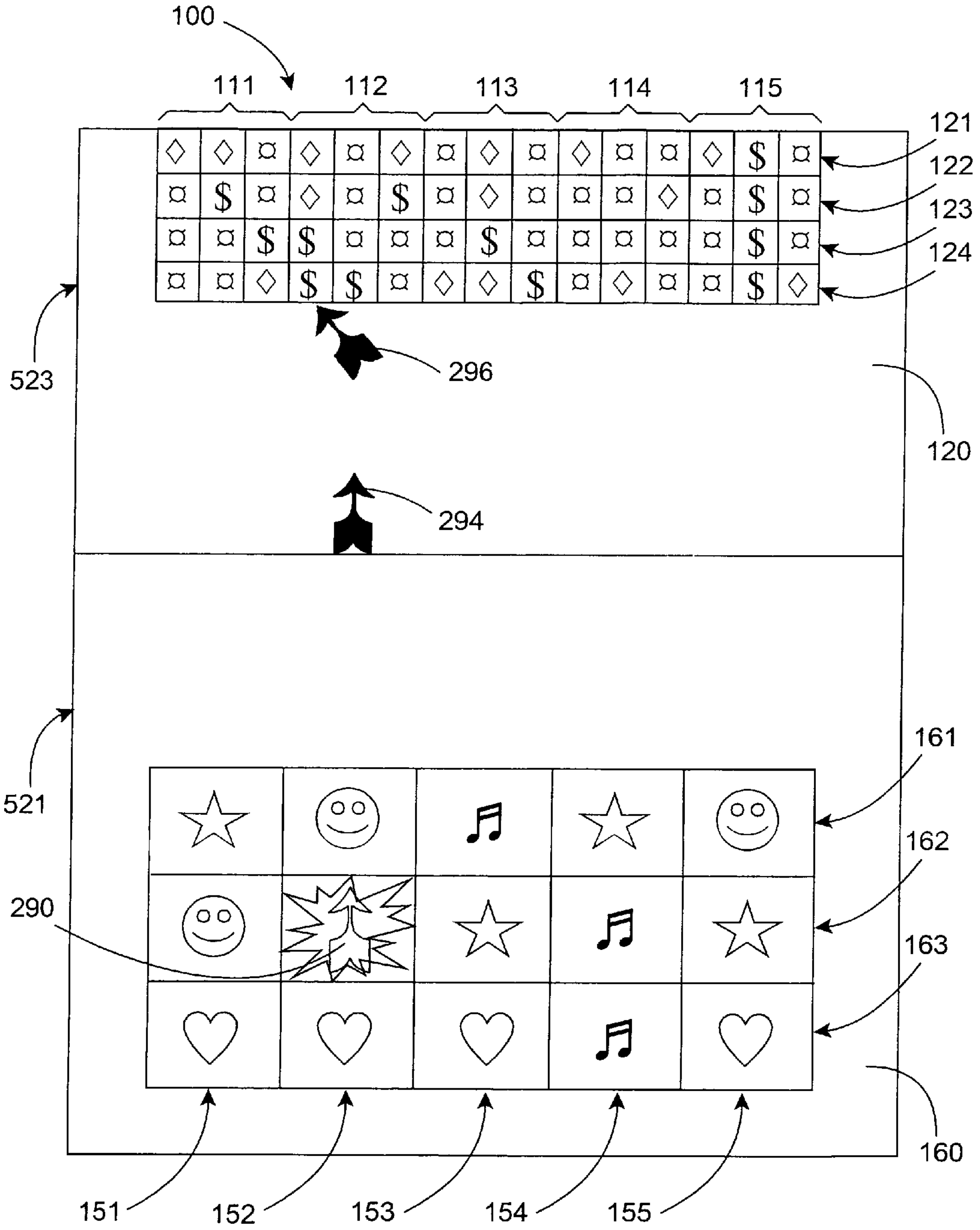
FIG. 2 is a front view of a display of a game according to an embodiment of the present invention.
Figure 3:
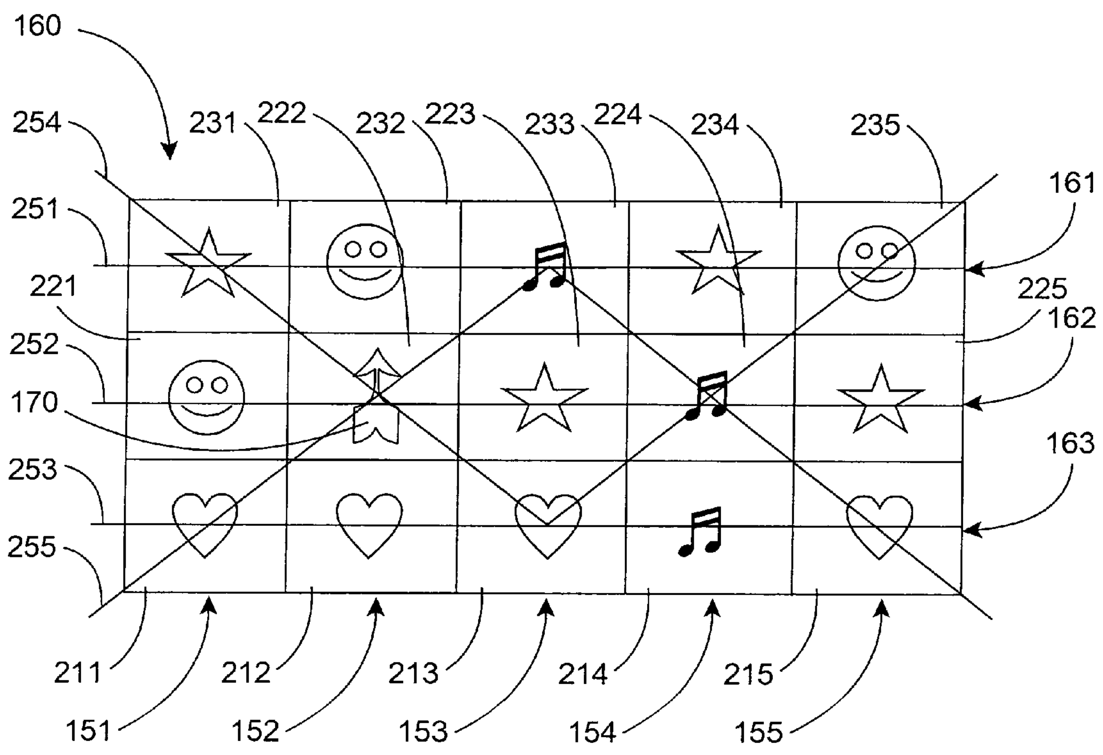
FIG. 3 is a front view of a primary game display according to an embodiment of the present invention.
Figure 6:
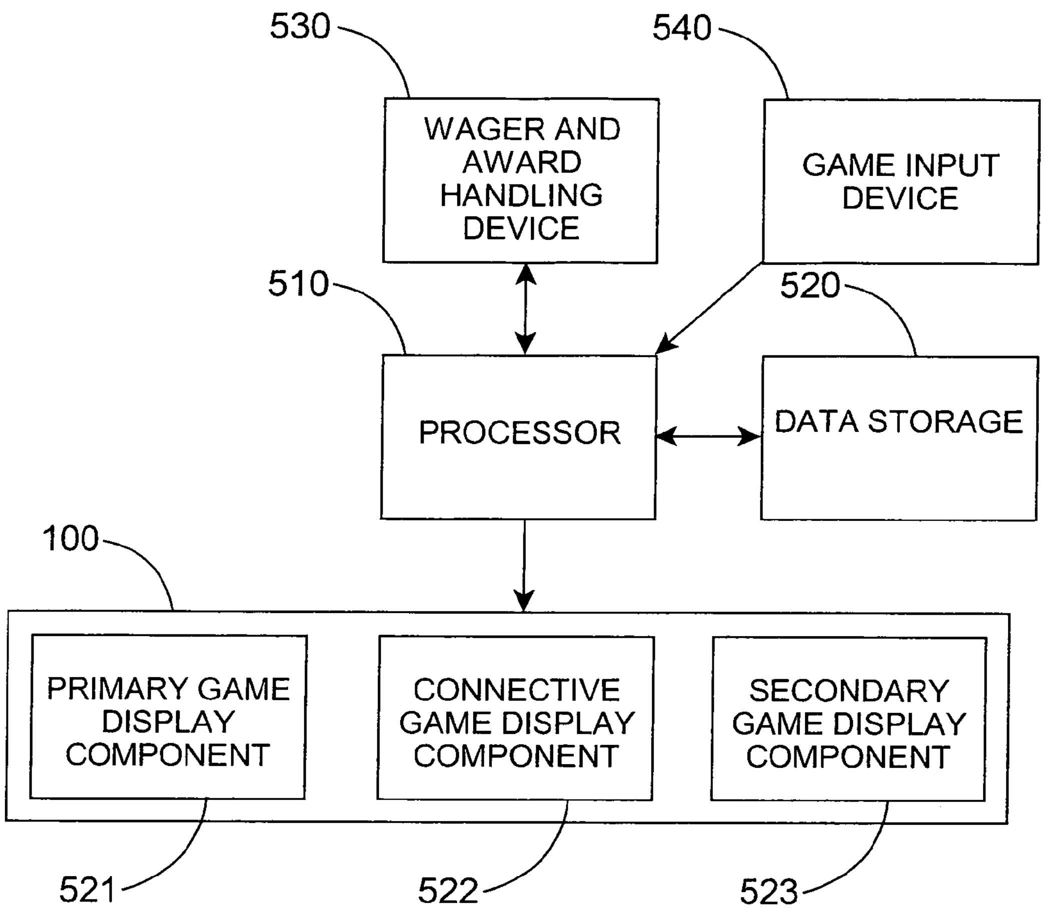
FIG. 6 is a block diagram of a multi-reel slot machine device according to an embodiment of the present invention.

Reference is now made to the figures wherein like parts are referred to by like numerals throughout. Referring generally to the figures, the present invention includes a method and device for conducting a game of chance. Referring to FIGS. 1A, 1B, and 6 a device for conducting a game of chance according to an embodiment of present invention utilizes a display 100 consisting of a primary game display component 521, an optional connective game display component 522, and a secondary game display component 523. In an optional embodiment, the primary game display component 521, the connective game display component 522, and the secondary game display component 523 may be adjacent and stacked vertically upon one another. In alternate optional embodiments, the primary game display component 521, the connective game display component 522, and the secondary game display component 523 may be separated from one another or oriented differently with respect to one another. It is noted that in an optional embodiment, the primary game display component 521, the connective game display component 522, and the secondary game display component 523 may be separate devices or separate areas on a single device. It is noted that these devices need not be physically proximate and one or more of the primary game display component 521, the connective game display component 522, and the secondary game display component 523 may be remote from the others. In an optional embodiment, the connective game display component 522 may be omitted and the present invention may be conducted with only a primary game display component 521 and a secondary game display component 523.

Referring to FIGS. 1A, 1B, 2, 3, and 6, the primary game display component 521 displays a primary game display 160 for a game. Optionally, the game is a multi-reel slot game. In one such optional embodiment, the primary game display 160 includes a matrix of reel indicium locations 211-215, 221-225, 231-235, organized into rows 161-163 and columns. In an optional embodiment, the columns are, or represent, movable reels 151-155, and the reel indicium locations 211-215, 221-225, 231-235 each display a reel indicium selected from a predefined set of reel indicia. In an optional embodiment in which the multi-reel slot game uses mechanical reels, the reels may include a fixed sequence of reel indicia and outcomes may be generated by the reel indicia displayed when the mechanical reels are stopped. In an optional embodiment in which the multi-reel slot game utilizes computer generated graphics, there may be no physical reel or reel strip, and outcomes may include any reel indicia selected from the set of reel indicia on any reel in any order.

In an optional embodiment in which the game is a multi-reel slot game, reel indicium locations 211-215, 221-225, 231-235 of the primary game display 160 are configured into paylines 251-255. In an optional embodiment, each payline 251-255 includes a plurality of reel indicium locations 211-215, 221-225, 231-235. For example, in the optional embodiment of FIGS. 1A, 1B, and 3, the paylines 251-255 each include one reel indicium location from each reel 151-155. It is noted that any quantity of paylines comprising any quantity, configuration, or grouping of reel indicium locations may be provided.

In an optional embodiment, a game may be initiated in response to the receipt of a wager from a player. Where the game is a multi-reel slot game including paylines, the wager may be allocated to one or more of the paylines 251-255. In such an optional embodiment, each payline allocated at least a portion of the wager may be considered an active payline. Continuing with the example, the outcome or outcomes of the multi-reel slot game would be determined by the reel indicia and reel indicia combinations appearing along active paylines.

Referring to FIGS. 1A, 1B, 2, 4A-4E, and 6, the secondary game display component 523, displays a secondary game display 120. In an optional embodiment, the secondary game display 120 includes target indicia. The target indicia could be arranged in any manner. For example, in the optional embodiment of FIGS. 1A, 1B, 2, and 4A-4E, the target indicia are arranged into a rectangular array. In a further optional embodiment, the target indicia may be segregated into subsets 111-115, with each subset 111-115 associated with one or more reels 151-155 displayed in the primary game display 160. Optionally, the subsets 111-115 are disjoint and each subset is associated with only one reel 151-155. For example, FIGS. 4A-4E show one subset 112 in detail; in this example, the subset 112 is associated with the second reel 152 from the left of the primary game display 160 shown in FIGS. 1A, 1B, and 2. Referring again to FIGS. 1A, 1B, 2, and 4A-4E, in an optional embodiment, the target indicia 311-322 may be organized into a rectangular array of rows 121-124 and columns. It is contemplated that other arrangements of the target indicia may be utilized and displayed in the secondary game display 120. In the optional embodiment illustrated, target indicia are shown as uniform-sized blocks. In alternate optional embodiments, target indicia 311-322 may vary in size.

Target indicia 311-322 may be depicted identical to one another or may each have different display attributes. For example, in the optional embodiment of FIGS. 1A, 1B, 2, and 4A-4E, different target indicia have different display attributes corresponding to a dollar sign, a diamond, or a spoked circle.

Referring to FIGS. 1A, 1B, and 6, in an optional embodiment, a connective game display component 522 may display a connective display 140 showing a portion of a non-reel game interaction between the primary game display 160 and the secondary game display 120. In an optional embodiment, the primary game display component 521 may be adjacent to the connective game display component 522 which, in turn, may be adjacent to the secondary game display component 523. In an alternate optional embodiment, the primary game display component 521, the connective game display component 522, and the secondary game display component 523 may be rearranged, separated from one another, or utilize the same display device.

It is noted that in an optional embodiment the connective game display 140 may not necessarily always be displayed simultaneously with the primary game display 160 and secondary game display 120. For example, the connective game display component 522 may be a logical display sharing the same physical display device as the primary game display component 521 and/or secondary game display component 523. In one such optional embodiment, the connective game display 140 may appear during a non-reel game interaction, then disappear during the multi-reel game or during the selection of target indicia (described in greater detail below) to be replaced by a primary game display 160 or secondary game display 120, respectively.

In another optional embodiment, the transition from one display to another during the non-reel game interaction may be illustrated on a single display device with the connective game display 140 simulating a transition from the primary game display 160 to the secondary game display 120. For example, a transition could be displayed by fixing certain display elements (such as a reel indicium) in a fixed position, with the background display elements appearing to move continuously from one display to the next, giving the appearance that the connective game display 140 is transitioning between the primary game display 160 and the secondary game display 120.

As noted above, a connective game display 140 is not necessary to the present invention and certain embodiments may omit a connective game display 140 and connective game display component 522. In such optional embodiments, a transition from a primary game display to a secondary game display could be illustrated in many different ways. For example, in an optional embodiment lacking a connective display, a transition from the primary game display to the secondary game display may be simulated by altering the display characteristics, such as its size, shape, color, or animation, of a display element in the primary game display, while a second indicium appears on the secondary game display and proceeds to strike the target indicia. The second indicium could be a copy of the reel indicium shown in the primary game display or it could be distinct in appearance. An example of an optional embodiment omitting a connective game display is described below with respect to FIG. 2.

Referring to the optional embodiment of FIG. 6, a device according to the present invention may be controlled by a processor 510. That is, in an optional embodiment, the processor 510 may communicate with the display 100 to provide output to the display 100 and the primary game display component 521, secondary game display component 523, and, in an optional embodiment, a connective game display component 522. It is noted that the term "processor" is used broadly to include any hardware or software video drivers through which the display 100 is controlled.

A data storage 520 may also communicate with the processor 510. The data storage 520 could be any form of data storage or data storage device. In an optional embodiment, the data storage 520 stores game parameters and program instructions executable by the processor 510 to conduct a method according to an embodiment of the present invention. The game parameters could include any data used to conduct the game, such as a secondary game schedule associating target indicia with secondary awards, outcomes triggering non-reel game interactions and the non-reel game interactions conducted, a primary game schedule associating outcomes with primary awards, or the like.

As previously alluded, an optional embodiment of a device according to the present invention may utilize a display 100 comprising a primary game display component 521, a secondary game display component 523, and, optionally, a connective game display component 522. The various display components may be separate display devices, or may share one or more display devices among them. For example, in one optional embodiment, the display 100 is a single display device with the primary game display component 521, secondary game display component 523, and, optionally, connective game display component 522 as logical displays, e.g. display fields, windows, or the like, on the display 100.

As noted above, in an optional embodiment, the primary game display component 521 displays a primary game display 160 consisting of multiple movable slot reels. In the event that an outcome of the game triggers a non-reel game interaction as described in greater detail below, a secondary game display component 523 displays an secondary game display 120 consisting of an target indicia, which are selectable by the non-reel game interaction. In an optional embodiment, a connective game display component 522 may display a connective game display 140 illustrating the non-reel game interaction between the primary game display 160 and the secondary game display 120, such as by depicting a reel indicium traversing the connective game display 140.

In an optional embodiment, a device may include a wager and award handling device or devices 530 to receive a wager from a player and dispense awards. As may be appreciated, the wager and award handing device or devices 530 may be separate or may be a single device. The wager and award handing device or devices 530 may take any form, such as a device adapted to receive wagers and dispense awards in the form of bills or coins, vouchers or tickets, readable cards, electronically stored credits, or any other form.

In an optional embodiment in which input is received from a player, an embodiment of a device may also include a game input device 540. For example, in an optional embodiment, a game input device 540 may be used to receive input from a player to select wager amounts, wager options, and game options, if any. The game input device 540 may take any form, such as a touch screen, buttons, levers, or the like.

Figure 5:
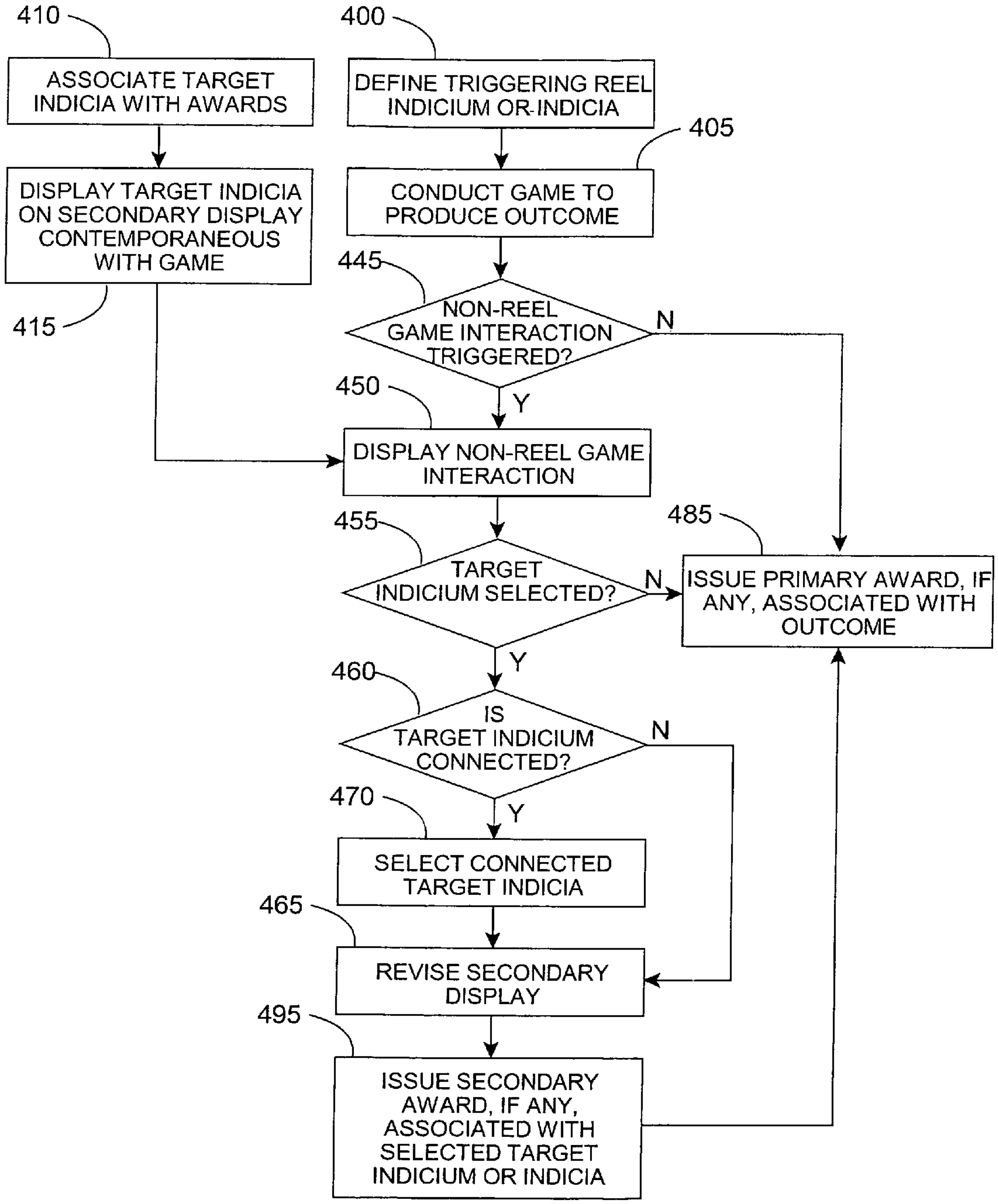
FIG. 5 is a flowchart of a method according to an embodiment of the present invention.

Turning to the method of the present invention, as shown in FIG. 5, certain parameters may be set up before conducting the game. For example, in a multi-reel slot game, the reel indicium or indicia associated with the triggering of a non-reel game interaction are defined 400. It is noted that a trigger could be the appearance of a single reel indicium, a combination of reel indicia, a pattern of reel indicia, or any other configuration of reel indicia that could be associated with an outcome.

Similarly, one or more target indicia are associated 410 with a secondary award. In an optional embodiment, all target indicia are associated with a secondary award; in another optional embodiment, only a portion of the target indicia are associated with a secondary award, e.g. selection of certain target indicia may or may not result in a secondary award. In an optional embodiment, the display attributes of the target indicia may identify which target indicia are associated with a secondary award. In the example shown in FIGS. 1A, 1B, 2, and 4A-4E, the target indicia associated with a secondary award are identified with a display attribute corresponding to a dollar sign ("$"), but the identity of the secondary award is concealed. In alternate optional embodiments, the display attribute may be unrelated to whether the target indicium is associated with a secondary award, or the display attribute may be changeable or partially or completely concealed. As noted, the value of the secondary award may be concealed, displayed, or displayed upon the occurrence of a particular event, such as the selection of the target indicium as described in greater detail below. The secondary award could take any form, including: a prize in the form of currency, coins, credits, progressive award, or the like; a game event in the multi-reel slot game, such as one or more free spins without placing a wager, a special reel indicium, e.g. wild or multiplier reel indicium, or the like; a game event in the non-reel game interaction, such as an extra selection, a multiplier, or the like; or any other award.

Referring generally to the figures, in an optional embodiment, the primary game display 160, where the game is conducted 405, and the secondary game display 120, where the target indicia are displayed, are displayed 415 contemporaneously. The game is conducted 405 to produce an outcome. For example, where the game is a multi-reel slot game as in the examples of FIGS. 1A, 1B, 2, and 3, an outcome may be produced by randomly selecting reel indicia to the reel indicium locations 211-215, 221-225, 231-235 of the primary display 160. In an electronic game, this selection may occur by simulating the motion of the reels 151-155 and randomly selecting reel indicia or combination of reel indicia to display the selected reel indicia. In a mechanical game, this selection may occur through stopping physically moving reels 151-155 to display the selected reel indicia.

The reels 151-155 display the selected reel indicia in the primary game display 160 and the outcome is determined. As discussed above, in an optional embodiment, the outcome is determined by the combination of reel indicia appearing along predefined active paylines 251-255. Additionally or alternatively, the outcome may be at least partially determined by the appearance of selected indicia, without regard to location, in any of the reel indicium locations 211-215, 221-225, 231-235, such as in a "scatter pay." Referring generally to FIG. 5, this outcome is compared to a schedule of primary awards and the player is issued 485 a primary award, if any, associated with the outcome. The primary awards could take any form, including a prize of money or credits, a game event in the multi-reel slot game, the triggering of a non-reel game interaction, or the like.

With continued reference to FIG. 5, a determination is made whether 445 a non-reel game interaction has been triggered by the outcome. As noted above, triggers could be based on the appearance of a reel indicium, the appearance of a combination of reel indicia, the appearance of a reel indicium or reel indicia in a specified reel indicium location, or any other outcome. If no non-reel game interaction is triggered, the player is issued 485 the primary award, if any, and the game is terminated.

Where a non-reel game interaction is triggered, the non-reel game interaction is displayed 450. As illustrated in FIGS. 1A, 1B, and 4A-4E, the non-reel game interaction involves the primary game display 160, the secondary game display 120, and, in an optional embodiment, a connective game display 140. The non-reel game interaction could be displayed in any manner, with the goal of selecting a target indicium or multiple target indicia in the secondary display. In an optional embodiment, the non-reel game interaction includes an animation.

For example, in FIGS. 1A and 1B, the non-reel game interaction is triggered by the appearance of a reel indicium in the form of an arrow 190 in a reel indicium location 211-215, 221-225, 231-235 on the primary game display 160 as part of the outcome of the multi-reel slot game. In this embodiment, the display of rotation of the reels 151-155 depicts the reels rotating towards the secondary game display 120 and the non-reel game interaction is displayed by initiating an animation showing the arrow 190 that triggered the non-reel game interaction flying off, or thrown from, the reel indicium location. Optionally, this display may be enhanced by timing the flight of the arrow 190 to coincide with the stoppage of the spinning reels. The animated arrow 192 may be shown flying across the primary game display 160. To depict interaction, an animated arrow 194 may be shown traversing the connective game display 140, and an animated arrow 196 on the secondary game display 120 may be shown striking a target indicium 311 as shown in FIGS. 4A-4E. As may be appreciated, the transitions from depiction of the reel indicium, e.g. arrow, crossing the primary game display 160 to the connective game display 140 to the secondary game display 120 may be timed so that the flight appears seamless and the player sees a continuous flight from the reels 151-155 to the target indicia.

It is noted that the interaction need not be direct and the non-reel interaction may include display elements for entertainment purposes. For example, in the optional embodiment illustrated in FIG. 1B, the arrow 190 does not travel in a straight line from the reels 151-155, but rather flies in an indirect path.

In other optional embodiments, the reel indicium could be depicted in some other way, or travel in some other fashion, to the secondary game display 120. For example, in an alternate optional embodiment, the display of the rotation of the reels may be other than towards the secondary game display 120, with the non-reel game interaction using a different mode of selection of target indicia, such as by a reel indicium flying in a direction other than the apparent direction of rotation of the reels 151-155 or flying in a trajectory that changes direction and/or bounces off of the bottom or sides of the primary game display 160. It is noted that in one such optional embodiment, the trajectory may result in the selection of multiple target indicia.

As noted above, an optional embodiment of the present invention may omit a connective game display. In one such optional embodiment, the non-reel game interaction may be displayed by initiating an animation showing the reel indicium leaving the reels 151-155, and then disappearing at the edge of the primary game display 160 to reappear at the edge of the secondary game display 120 with the "flight path" between the two not displayed.

In another optional embodiment in which a connective game display is omitted, the reel indicium triggering the non-reel interaction may remain on the reels 151-155 but change in display characteristic, such as changing in size, shape, color, disappearing, and/or initiating an animation. In one such optional embodiment, an additional indicium, optionally a copy or representation of the triggering reel indicium, appears on the secondary game display 120 to select a target indicium or target indicia. As may be appreciated, the additional indicium appearing on the secondary game display 120 may be animated to travel toward the target indicia along a trajectory toward the target indicia. Thus, in the example of FIG. 2, the triggering reel indicium, in this case an arrow 290 may be altered to change color, blink, or disappear from the primary game display 160 and an additional indicium, in this case a duplicate arrow 294, may appear on the secondary game display 120. The duplicate arrow 294 may be animated to travel toward the target indicia so that an animated duplicate arrow 296 may appear to strike a target indicium thereby selecting it. In selecting a target indicium, the game method may proceed in a manner consistent with the description below and as illustrated in FIGS. 4A-4E.

Referring generally to the figures, as may also be appreciated, the non-reel game interaction need not be depicted as an arrow, or even as a reel indicium, but could be any depiction. Moreover, the non-reel game interaction and/or selection of the target indicium need not be shown as the motion of an object from the primary game display 160 to the secondary game display 120. To the contrary, any graphical representation illustrating an interaction between the primary game display 160 and the secondary game display 120 may be used to depict a non-reel game interaction and the selection of a target indicium or target indicia.

Referring again to FIG. 5, a determination is made whether the non-reel game interaction resulted in the selection 455 of a target indicium or target indicia. In an optional embodiment, a target indicium will be selected on each non-reel game interaction. In another optional embodiment, there may be a possibility that a non-reel game interaction may be conducted that does not result in the selection of a target indicium. In the optional embodiment FIG. 4B, a target indicium 311 is selected as a result of the arrow 196 on the secondary display striking it.

In an optional embodiment, only the target indicium or target indicia that are struck are selected. In another optional embodiment, shown in FIG. 5, a determination is made whether the selected target indicium is connected 460 to any other target indicia and, if so, selecting 470 all connected target indicia as well. For example, in an optional embodiment target indicia may be connected by physical location. In one such example, adjacent target indicia may be connected so that the selection of a target indicia results in the selection of target indicia adjacent to the selected target indicia.

In another optional embodiment, target indicia may be connected through a common display attribute. For example, each target indicia represented by the same symbol, color, shape, or the like, may be connected. In such an example, selection of a target indicia would result in the selection of any target indicia also sharing the same display attribute as well.

In yet another optional embodiment, target indicia may be connected by physical location and common display attribute. For example, target indicia may be connected if they share a common display attribute and are adjacent. An illustration of this latter example is given in FIGS. 4B-4D, in which the selection of a target indicium 311 depicted as a dollar sign also resulted in the selection of target indicia 312, 314 depicted as dollar signs adjacent to the right and above the target indicium struck 311. In this example, other target indicia either not adjacent to the target indicium struck 311, or not having the same display attribute as the target indicium struck 311, i.e. depicted as a dollar sign are not selected.

In alternate optional embodiments, other methods of selecting target indicia additional to the target indicium struck may be employed, or only the target indicium struck may be selected. For example, in one such alternate optional embodiment, target indicia may be connected through adjacency and common display attribute. In this optional embodiment, one or more target indicia may have a "wild card" display attribute that allows the "wild card" target indicium to be selected any time an adjacent target indicium is selected. In such an embodiment, adjacent target indicia having the same attribute as the struck target indicium may be selected as well as adjacent "wild card" target indicia.

In a further optional embodiment of the present method, selected target indicia may be displayed as dropping in the target indicia array toward the primary game display 120. In such an embodiment, certain special target indicia may be selected along with the selected target indicium as long as no unselected target indicia block the special target indicia from the selected target indicium. In other words, special target indicia would be selected unless "held into" the array of target indicia by unselected target indicia.

Figure 4A:
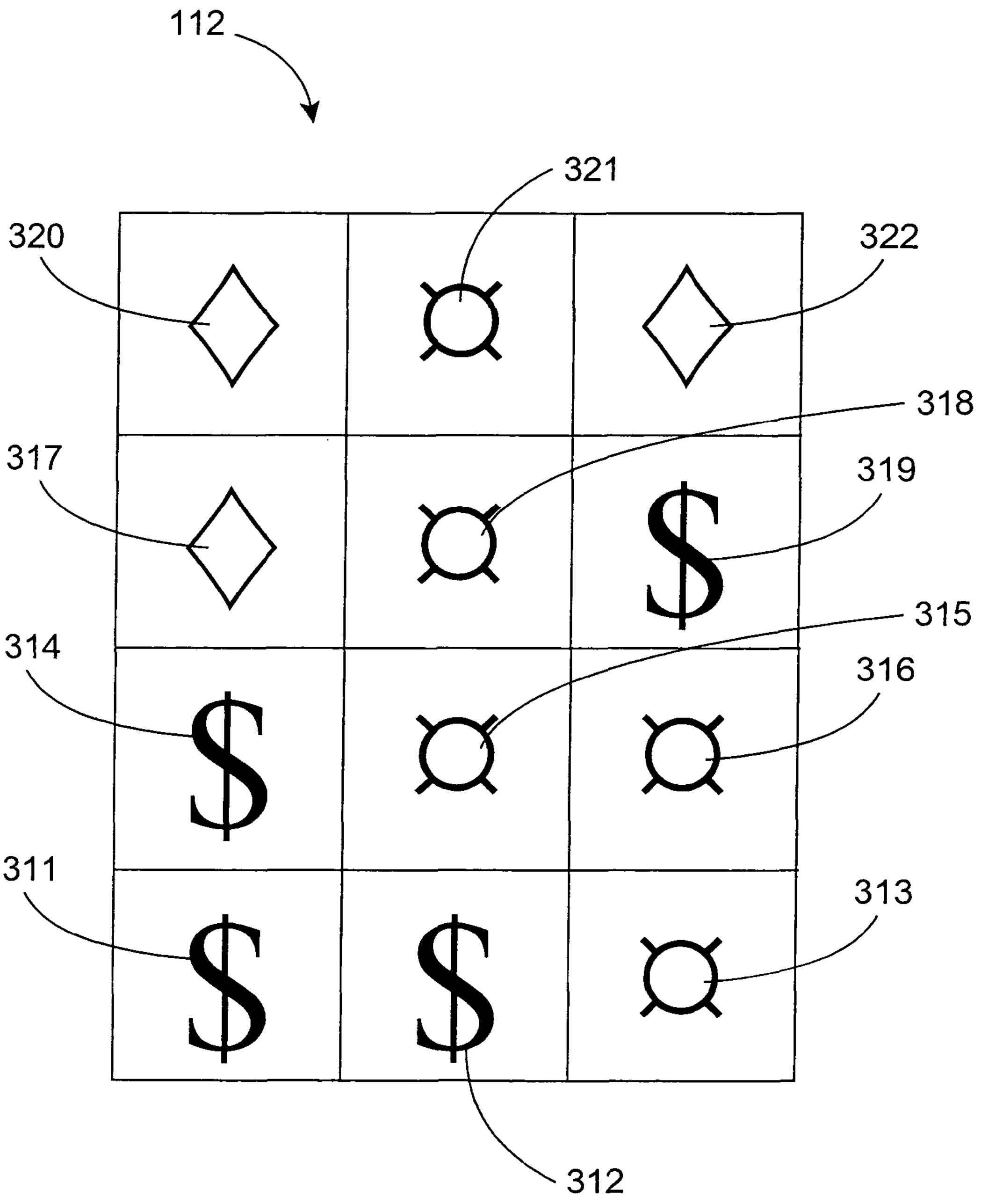
FIG. 4A is a front view of a portion of a secondary game display prior to a non-reel game interaction according to an embodiment of the present invention.
Figure 4B:
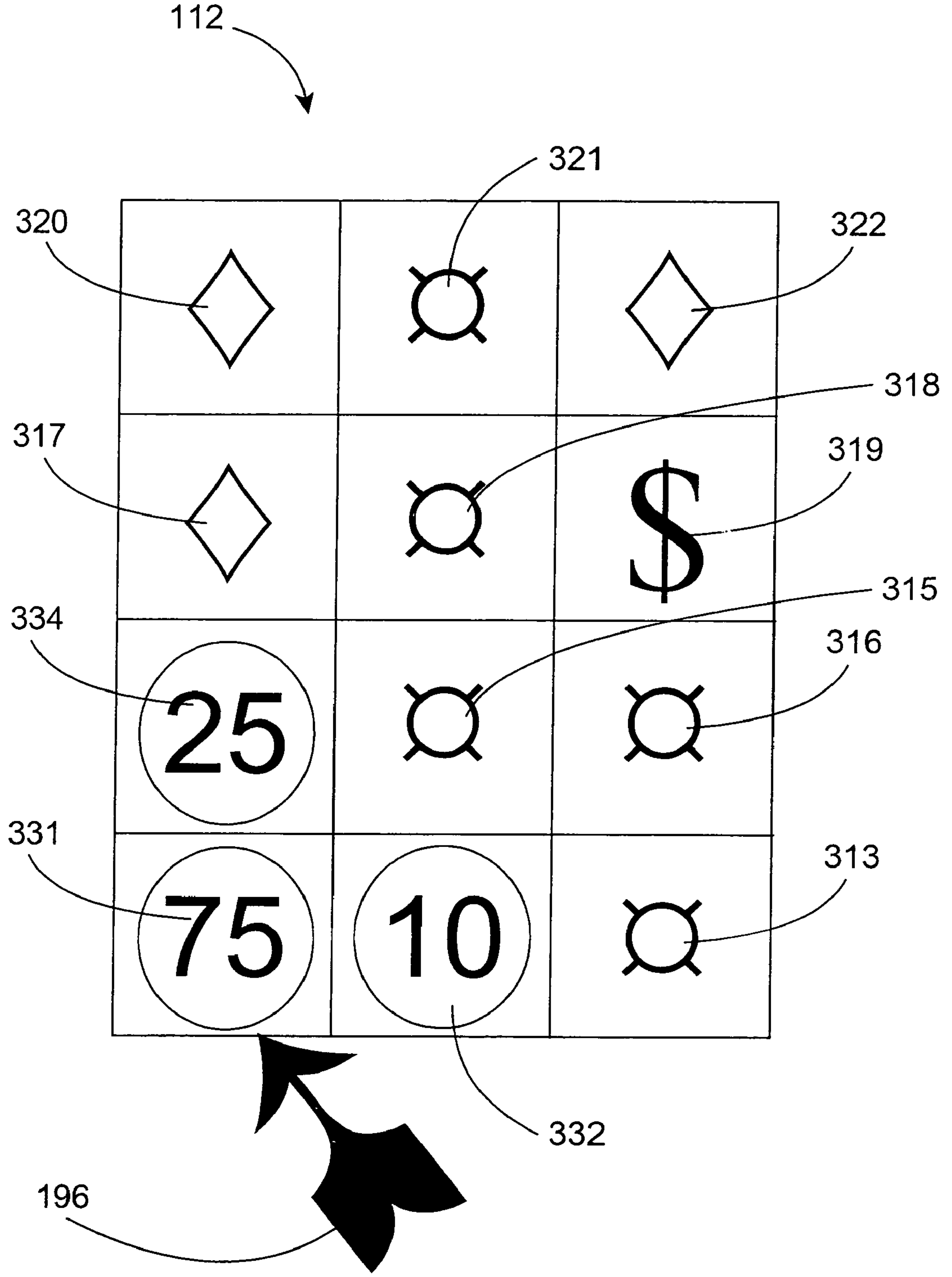
FIG. 4B is a front view of a portion of the secondary game display shown in FIG. 4A during a non-reel game interaction.

The secondary award associated with the selected target indicium or target indicia is issued 495. As previously discussed, the secondary award represented by a target indicium associated with a secondary award may be concealed. In an optional embodiment shown in FIGS. 4A and 4B, selected target indicia 311, 312, 314 may change after selection to reveal the associated secondary award. For example, in FIG. 4B, selected target indicia may be depicted as numbers 331, 332, 334 representing the size of the prize associated with the selection of each selected target indicia. In the example of FIG. 4B, the player would be issued an award of 110 credits (25+75+10).

In an alternate optional embodiment, rather than revealing the associated quantity for each selected target indicium while still in the array of target indicia, selected target indicia may be displayed as falling off away from the array of target indicia. As the selected target indicia fall, the secondary award may be revealed, such as by exploding, or otherwise transforming, to reveal the secondary award. As may be appreciated, the revelation of the secondary award may occur while the selected target indicia remain on the secondary game display 120, as the traverse the connective game display 140, or appear on the primary game display 160 depending on the embodiment.

With reference to FIG. 5, in an optional embodiment, the secondary game display 120 is revised 465. For example, in one optional embodiment, selected target indicia are removed from the secondary game display and the target indicia are rearranged. In a further optional embodiment, the target indicia may be replenished by, for example, replacing target indicia, replacing removed target indicia, rearranging target indicia, replacing secondary awards associated with target indicia, altering which target indicia are associated with secondary awards, or the like. In an optional embodiment, the secondary game display 120 may persist over multiple games, so that a succeeding game may be conducted with a target array revised in a preceding game.

Figure 4C:
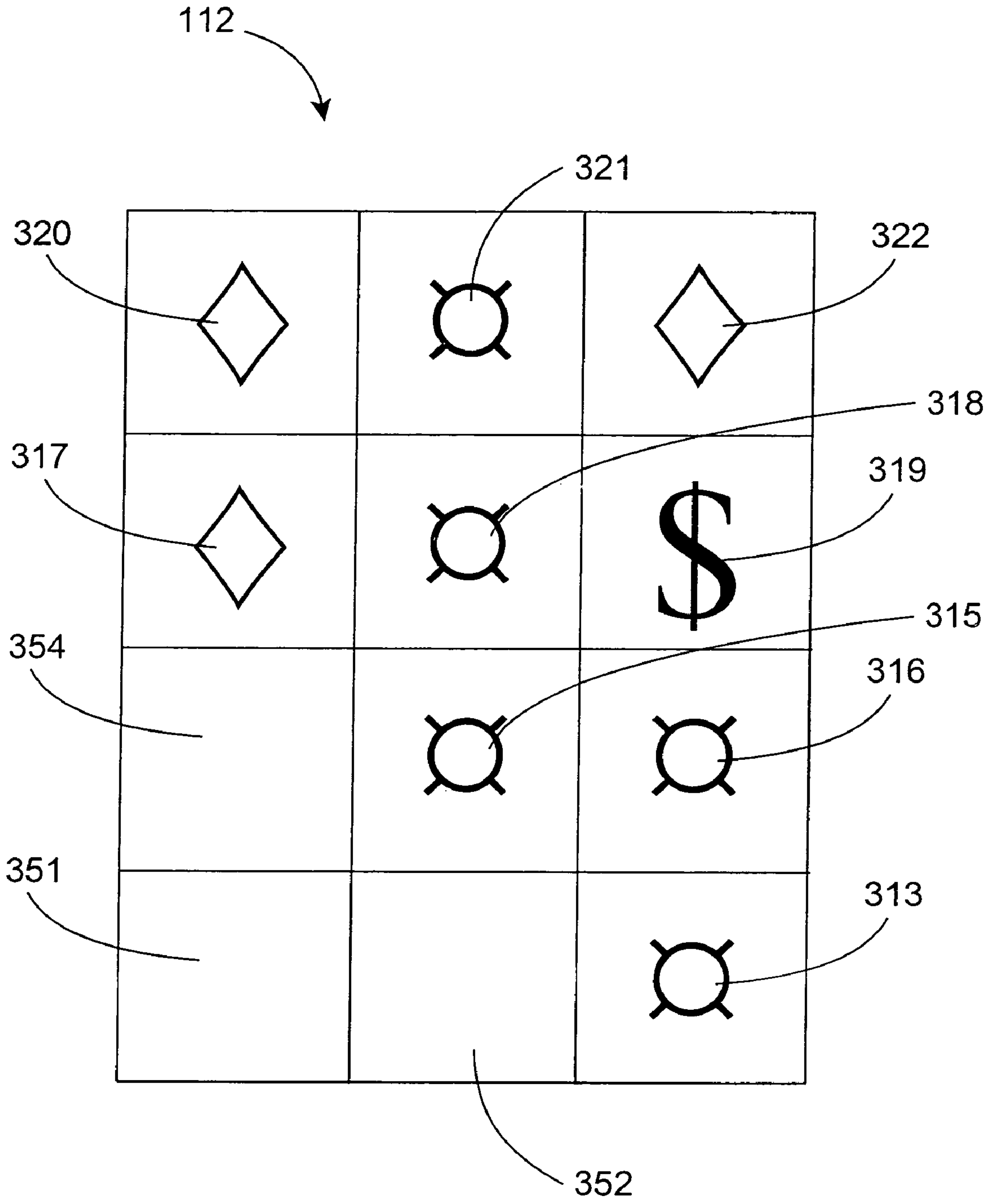

In the optional embodiment of FIG. 4C, selected target indicia are removed from the array of target indicia leaving empty target indicium locations. In an optional embodiment in which the secondary game display 120 persists over multiple games, removing selected target indicia may result in conducting non-reel game interactions with a target indicia array having empty target indicium locations. In an optional embodiment, an empty target indicium location is treated as a nullity that is not selectable. In an optional embodiment in which a target indicium is selected by a moving reel indicium, an empty target indicium location may be treated as vacant, thereby allowing the moving reel indicium to pass through.

Figure 4D:
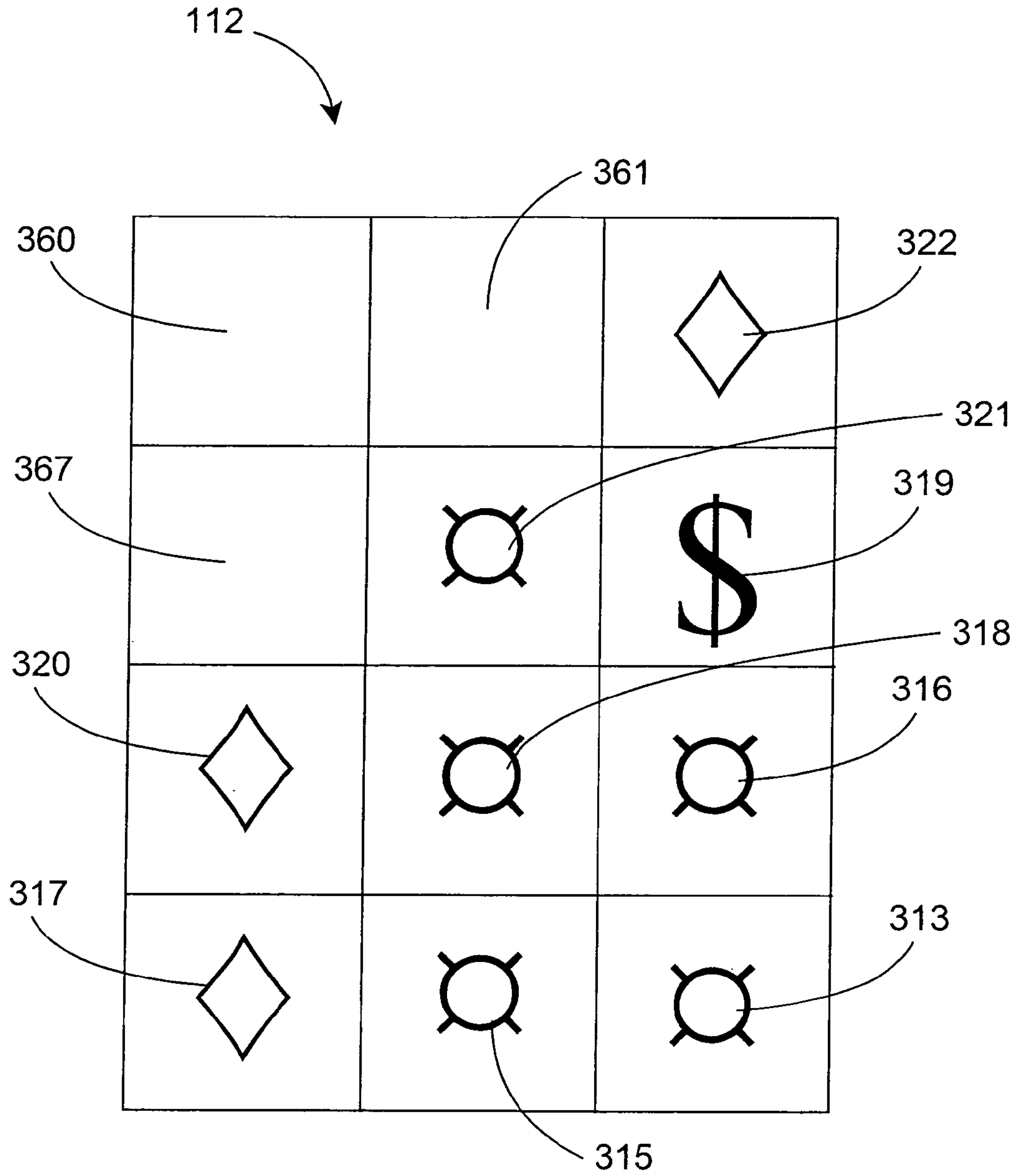
FIG. 4D is a front view of a portion of the secondary game display shown in FIG. 4A following a revision.

In a further optional embodiment illustrated in FIG. 4D, a rearrangement of the target indicium in the secondary game display 120 may occur. As described in greater detail below, this rearrangement may be undertaken automatically whenever empty target indicia locations are created, undertaken upon command from the processor and/or the player, undertaken upon a particular game event in the multi-reel game or in the selection of target indicia, or undertaken under any other circumstances. Additionally, the rearrangement could occur alone or in combination with replenishing the target indicia. The rearrangement could take any form, including randomly rearranging the remaining target indicia, rearranging in a particular pattern, or rearranging in any other fashion.

For example, in an optional embodiment, a rearrangement includes defining a pattern of movement. Target indicia are moved into the empty target indicium locations in the pattern of movement. This movement is repeated until no further movement can occur in the pattern of movement. As may be appreciated, the pattern of movement could include movement in any direction, multiple directions, or a pattern of directions, and could include skipping over target indicia. In the optional embodiment of FIG. 4D, the pattern of movement is downward, e.g. toward the row of target indicium locations proximate the primary game display 160. As illustrated in FIGS. 4C and 4D, the empty target indicium locations 351, 352, 354 created by the removal of the selected target indicia may be filled by moving the target indicia 315, 317 adjacent to the empty target indicium locations 351, 352, 354 in the pattern of movement, e.g. downward. By repeating the movement of target indicia into empty target indicium locations in the pattern of movement, the target indicia 315, 316, 317, 320, 321 above the empty target indicium locations cascade downward leaving empty target indicium locations 360, 361, 367 above them.

A replenishment of target indicia may also be provided. That is, in an optional embodiment in which selected target indicia are removed from the target indicia array in the secondary game display 120, the removed target indicia may be replenished. In an optional embodiment, this replenishment may occur by placing replacement target indicia into the empty target indicia locations created by the removal. In another optional embodiment, the replenishment may be coupled with a rearrangement (such as that previously described) so that the replacement target indicia may be placed into target indicia locations different from those from which the selected target indicia were removed. In yet another optional embodiment, the replenishment may include revising the associations between target indicia and secondary awards so that different target indicia may be associated with different awards after the replenishment. In one such optional embodiment, concealed secondary prizes may be revealed prior to the replenishment.

A replenishment may be triggered by any event, including automatically upon the removal of selected target indicia, upon an outcome of the multi-reel slot game, upon a player input request, upon a designated level of depletion of selectable target indicia, upon the completion of a predetermined number of multi-reel slot games or completion of a predetermined number of non-reel game interactions, or any other event in the multi-reel slot game or the selection of target indicia in the secondary game display 120. It is contemplated that a replenishment may be limited to a particular subset of target indicia while other subsets of target indicia may be left unreplenished, or replenishment may occur universally across the array of target indicia upon a single trigger.

Figure 4E:
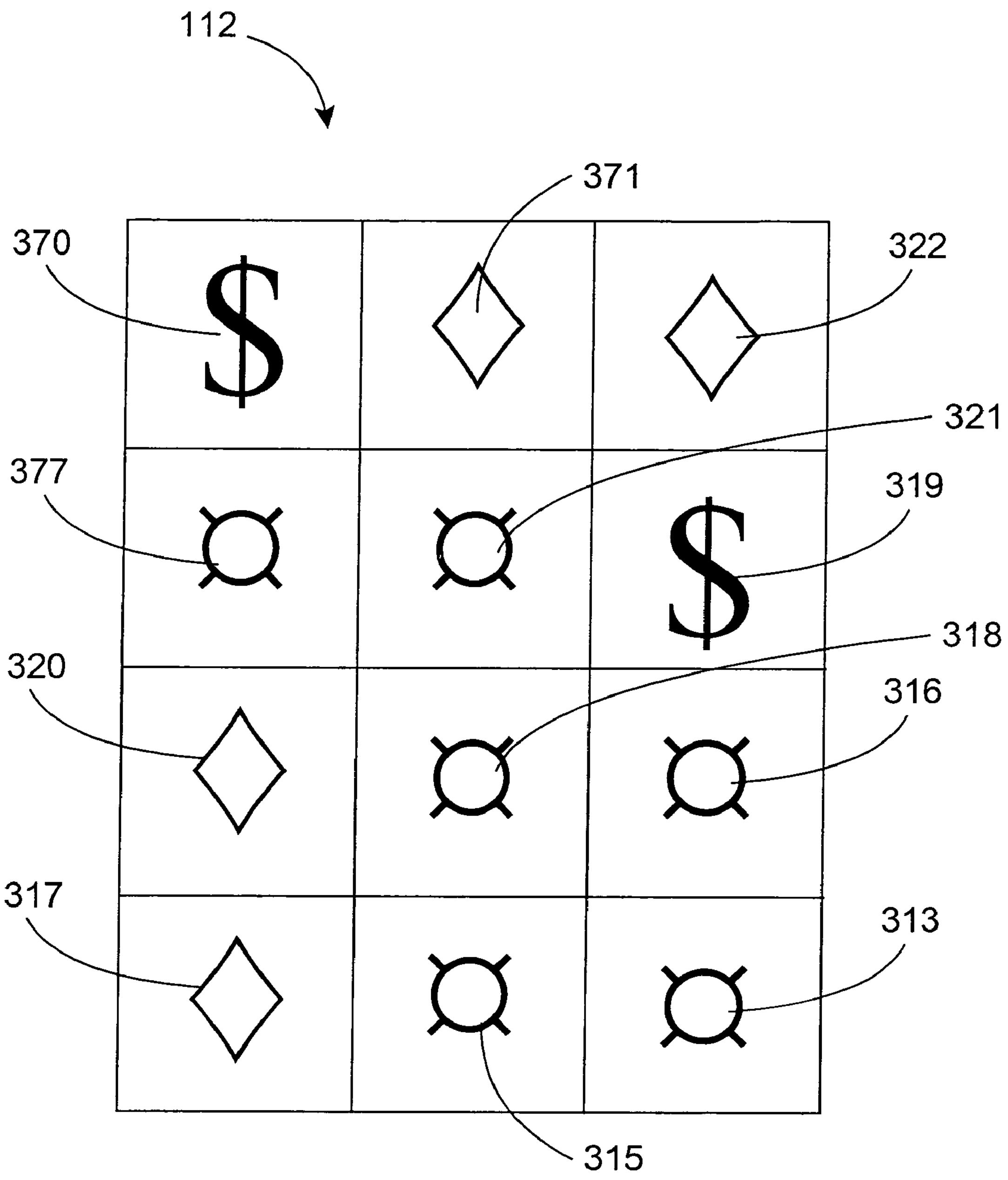
FIG. 4E is a front view of a portion of the secondary game display shown in FIG. 4A following a replenishment.

For example, in the optional embodiment of FIGS. 4D and 4E, a replenishment may be triggered upon a rearrangement that creates one or more empty target indicium locations 360, 361; 367 in the row of the target indicia array furthest from the primary game display 160. Continuing with the example, the replenishment may proceed by adding new target indicia 370, 371, 377 into the previously empty target indicium locations 360, 361, 367.

In an optional embodiment in which the secondary game display 120 persists over multiple games, the secondary game display 120 as it appears in a preceding game is carried over to a subsequent game. Thus, in one such optional embodiment, any revisions to the secondary game display 120, including any removals, rearrangements, and replenishments of target indicia, occurring in a game may be retained for subsequent games, and a replenishment occurring in subsequent game may affect a revision occurring in a preceding game. As noted above, a replenishment may occur on any conditions, including on a periodic schedule where a replenishment occurs after a fixed or varying number of games have been played. In a variation on one such optional embodiment, a replenishment may occur on a periodic schedule unless triggered earlier by, for example, a player request or the removal of a particular number of target indicia.

In an optional embodiment (not shown) of the method and device disclosed herein, additional supplemental secondary game displays, with their own associated supplemental target indicia and supplemental non-reel game interactions, may be provided. The supplemental secondary game displays may be displayed on a supplemental secondary game display component on a separate display device or on display device shared with the one or more of the secondary game display component, primary game display component, and, in an optional embodiment, connective game display component.

In such an embodiment, triggering of a supplemental non-reel game interaction may be at least partially associated with at least one of: the previously described non-reel game interactions, the outcome of the multi-reel slot game, or the like. A supplemental non-reel game interaction may include the interaction of the primary game display, the secondary game display, the connective game display with the supplemental secondary game display and the supplemental target indicia thereon. The result of the supplemental non-reel game interaction may be the selection of one or more supplemental target indicia which may be associated with a supplemental award. Selection of supplemental target indicia could occur in any fashion, including those selection methods discussed above with respect to selection of target indicia in a non-reel game interaction. The supplemental awards may take any form, such as those forms discussed above with respect to secondary awards. In one optional embodiment, the supplemental awards may take the form of a shared bonus that is distributed to the player and other players, optionally according to the supplemental target indicia selected. For example, a shared bonus could be distributed to the player whose outcome or non-reel game interaction triggered the supplemental non-reel game interaction and/or to a group of other players as an envy award based on the other players' wagers, prior results, prior participation, or the like.

For example, in an optional embodiment, certain target indicia in the secondary game display may be associated with a supplemental non-reel game interaction. If target indicia with such an associated is selected during a non-reel game interaction, a supplemental non-reel game interaction is triggered. In the supplemental non-reel game interaction, a supplemental target indicium or target indicia are selected. This chain reaction could continue for as many levels of supplemental secondary game displays as may be provided, with the player receiving any supplemental awards accumulated during the supplemental non-reel game interaction(s).

The supplemental secondary game display may be revised in any manner discussed with respect to revising the secondary game display. For example, supplemental target indicia displayed in such supplemental secondary game display may be removed, rearranged, or replenished upon any of the bases previously described for replenishment of target indicia within the secondary game display.

While certain embodiments of the present invention have been shown and described it is to be understood that the present invention is subject to many modifications and changes without departing from the spirit and scope of the claims presented herein.

We claim:

1. A device for conducting a game of chance comprising:
- a processor;
- a display in communication with said processor comprising:
  - a primary game display component adapted to display a plurality of reels, each reel including reel indicia such that the reel indicia displayed on said reels produce an outcome, at least one of said outcomes triggering a non-reel game interaction; and
  - a secondary game display component physically distinct from said primary game display component, said secondary game display component adapted to display a secondary game display including a plurality of target indicia selectable by said non-reel game interaction wherein said secondary game display persists over a series of two or more games of chance; and
- a data storage in communication with said processor storing a secondary game schedule associating at least one of said target indicia with at least one secondary award, at least one non-reel game interaction at least partially related to an outcome, and instructions executable by said processor for executing a method comprising:
  - receiving a wager;
  - controlling said primary game display component to produce an outcome;
  - if said outcome is associated with a non-reel game interaction, displaying on said primary game display component and said secondary game display component said associated non-reel game interaction determined by said outcome; and
  - if said non-reel game interaction results in the selection of at least one target indicium in said secondary game display component, revising said secondary game display component and issuing said secondary award, if any, associated with said selected target indicium;

conducting at least one subsequent game by displaying reel indicia on said reels in said primary game display component to produce an outcome;

if said outcome includes a display of reel indicia triggering at least one non-reel game interaction, displaying said triggered non-reel game interactions determined by said outcome at said primary game display component and secondary game display component wherein said non-reel game interaction includes displaying said secondary game display component as displayed in a preceding game with any revisions in said secondary game display component performed in said preceding game; and if any triggered non-reel game interaction results in the selection of at least one target indicium in said secondary game display component, revising said secondary game display component and issuing a secondary award, if any, associated with said selected target indicium.

2. The device of claim 1 wherein said outcome associated with a non-reel game interaction includes the display of a reel indicia associated with said non-reel game interaction in a display position on at least one of said reels.

3. The device of claim 2 wherein said primary game display component displays said plurality of reels in a matrix of reel indicium locations, said data storage stores at least one payline consisting of a plurality of said reel indicium locations such that said outcomes are produced by combinations of reel indicia displayed along said paylines, and said instructions further comprise allocating said wager to one or more paylines to thereby activate one or more paylines.

4. The device of claim 3 wherein said step of displaying said outcome comprises selecting and displaying at least one reel indicium at each reel indicium location of said primary game display component.

5. The device of claim 1 wherein said step of receiving wagers includes receiving game credits, and wherein at least one of said secondary awards on said secondary game schedule stored at said data storage is a quantity of game credits.

6. The device of claim 1 wherein at least one of said secondary awards on said secondary game schedule stored at said data storage is at least one free spin in which said game is conducted without requiring receipt of a wager.

7. The device of claim 1 wherein said instructions further comprise concealing said secondary awards associated with target indicia until the selection of a target indicium resulting in awarding of at least one of said secondary awards.

8. The device of claim 1 wherein said data storage further stores a primary game schedule associating at least one of said outcomes with at least one primary award, and said instructions further comprise:

after displaying said outcome, comparing said outcome to said primary game schedule; and issuing said associated primary award, if said outcome is associated with a primary award according to said primary game schedule.

9. The device of claim 1 wherein said instructions further comprise:

connecting each target indicium to zero or more other target indicia; and upon selection of a target indicium, additionally selecting target indicia connected to said selected target indicium.

10. The device of claim 9 wherein said connected target indicia are adjacent.

11. The device of claim 9 wherein each target indicium has a display attribute and said connected target indicia have a common display attribute.

12. The device of claim 11 wherein said target indicia are arranged such that any target indicium having a common display attribute are connected to all adjacent indicia.

13. The device of claim 1 wherein said target indicia are segregated into subsets, each subset being associated with one of said reels.

14. The device of claim 1 wherein said step of displaying said non-reel game interaction comprises initiating an animation depicting an additional indicium, separate from said reel indicia, appearing on said secondary game display component to interact with said target indicia.

15. The device of claim 14 wherein said animation depicts said additional indicium appearing on said secondary game display to strike at least one of said target indicia to select any target indicia struck.

16. The device of claim 1 wherein said step of displaying said non-reel game interaction comprises initiating an animation changing the visual appearance of said reel indicium while said reel indicium is stationary on said reel.

17. A device for conducting a game of chance comprising:

a processor;

a display in communication with said processor comprising:

a primary game display component adapted to display a plurality of reels, each reel including reel indicia such that the reel indicia displayed on said reels produce an outcome, at least one of said outcomes triggering a non-reel game interaction; and a secondary game display component physically distinct from said primary game display component, said secondary game display component adapted to display a secondary game display including a plurality of target indicia selectable by said non-reel game interaction; and a data storage in communication with said processor storing a secondary game schedule associating at least one of said target indicia with at least one secondary award, at least one non-reel game interaction at least partially related to an outcome wherein said secondary game display persists over a series of two or more games of chance, and instructions executable by said processor for executing a method comprising:

receiving a wager;

controlling said primary game display component to produce an outcome;

if said outcome is associated with a non-reel game interaction, displaying on said primary game display component and said secondary game display component said associated non-reel game interaction determined by said outcome; and if said non-reel game interaction results in the selection of at least one target indicium in said secondary game display component, revising said secondary game display component and issuing said secondary award, if any, associated with said selected target indicium, wherein said step of revising comprises removing selected target indicia from said secondary game display component, and said instructions further comprise replenishing said secondary game display component by at least one of adding target indicia to said secondary game display component, rearranging target indicia in said secondary game display component, replacing target indicia in said secondary game display component, and replacing one or more secondary awards associated with one or more target indicia in said secondary game display component.

18. The device of claim 17 further comprising a game input device and wherein said instructions further comprise receiving a replenishment request through said game input device and replenishing in response to receipt of said replenishment request.

19. The device of claim 17 wherein said instructions further comprise:

associating at least one non-reel game interaction with said replenishing; and replenishing in response to an outcome triggering said non-reel game interaction associated with said replenishing.

20. The device of claim 19 wherein said instructions further comprise:

displaying at said secondary game display component said target indicia arranged in at least two rows with one row proximal to said primary game display component and one row distal to said primary game display component; and associating at least one target indicium in said distal row with said replenishing.

21. The device of claim 19 wherein said instructions further comprise:

associating with each non-reel game interaction a replenishing, said replenishing comprising:

defining a pattern of movement in said secondary game display component;

removing all target indicia previously selected to produce empty target indicia locations;

rearranging remaining target indicia by moving target indicia into empty target indicium locations along said pattern of movement;

repeating said rearrangement until no target indicia remains may be moved to an empty target indicium location along said pattern of movement; and adding new target indicia into empty target indicia locations.

22. A device for conducting a game of chance comprising:

a processor;

a display in communication with said processor comprising:

a primary game display component adapted to display a plurality of reels, each reel including reel indicia such that the reel indicia displayed on said reels produce an outcome, at least one of said outcomes triggering a non-reel game interaction;

a secondary game display component physically distinct from said primary game display component, said secondary game display component adapted to display a secondary game display including a plurality of target indicia selectable by said non-reel game interaction; and a connective game display component physically distinct from at least one of said primary game display component and said secondary game display component, adapted to display said non-reel game interaction between said primary game display component and said secondary game display component, such that said reel indicium associated with said non-reel game interaction is depicted to travel off said reels of said primary game display component and traverse said connective game display component to appear on said secondary game display component; and a data storage in communication with said processor storing a secondary game schedule associating at least one of said target indicia with at least one secondary award, at least one non-reel game interaction at least partially related to an outcome wherein said secondary game display persists over a series of two or more games of chance, and instructions executable by said processor for executing a method comprising:

receiving a wager;

controlling said primary game display component to produce an outcome;

if said outcome is associated with a non-reel game interaction, displaying on said primary game display component and said secondary game display component said associated non-reel game interaction determined by said outcome, wherein said non-reel game interaction comprises initiating an animation of a reel indicium depicting said reel indicium traveling off said reels in said primary game display component across said connective game display component to said secondary game display component to interact with said target indicia; and if said non-reel game interaction results in the selection of at least one target indicium in said secondary game display component, revising said secondary game display component and issuing said secondary award, if any, associated with said selected target indicium.

23. The device of claim 22 wherein at least one of said reel indicium triggering a non-reel game interaction is displayed as an arrow directed toward said secondary game display component and said instructions further comprise:

displaying movement of said reels of said primary game display component during play of a game as rotation towards said secondary game display component; and upon an outcome including at least one of said reel indicia displayed as an arrow, initiating an animation of said reel indicia, said animation causing said reel indicium to strike at least one of said target indicia to select any target indicia struck.

24. A device for conducting a game of chance comprising:

a processor;

a display in communication with said processor comprising:

a primary game display component adapted to display a plurality of reels, each reel including reel indicia such that the reel indicia displayed on said reels produce an outcome, at least one of said outcomes triggering a non-reel game interaction;

a secondary game display component physically distinct from said primary game display component, said secondary game display component adapted to display a secondary game display including a plurality of target indicia selectable by said non-reel game interaction; and a supplemental secondary game display component distinct from said primary game display component and said secondary game display component, said supplemental secondary game display component adapted to display a plurality of supplemental target indicia selectable by a supplemental non-reel game interaction; and a data storage in communication with said processor storing a secondary game schedule associating at least one of said target indicia with at least one secondary award, at least one non-reel game interaction at least partially related to an outcome wherein said secondary game display persists over a series of two or more games of chance, a supplemental secondary schedule associating at least one of said supplemental target indicia with a supplemental award, at least one supplemental non-reel game interaction at least partially related to a non-reel game interaction, and instructions executable by said processor for executing a method comprising:

receiving a wager;

controlling said primary game display component to produce an outcome;

if said outcome is associated with a non-reel game interaction, displaying on said primary game display component and said secondary game display component said associated non-reel game interaction determined by said outcome;

if said non-reel game interaction results in the selection of at least one target indicium in said secondary game display component, revising said secondary game display component and issuing said secondary award, if any, associated with said selected target indicium;

displaying said supplemental non-reel game interaction on said secondary game display component and said supplemental secondary game display component if a non-reel game interaction associated with a supplemental non-reel game interaction is displayed on said secondary game display component; and if any triggered supplemental non-reel game interaction results in the selection of at least one supplemental target indicium in said supplemental secondary game display component, revising said supplemental secondary game display component and issuing said supplemental award, if any, associated with said selected supplemental target indicium.

25. A method of conducting a game of chance on a gaming device comprising:

defining a set of reel indicia within said gaming device;

receiving a wager at said gaming device;

conducting said game by said gaming device by displaying a primary game display containing a plurality of reels, each reel including reel indicia selected from said set of reel indicia, and randomly selecting the reel indicia displayed on said reels such that the reel indicia displayed on said reels produce an outcome, wherein at least one of the possible outcomes triggers a non-reel game interaction;

displaying a secondary game display on said gaming device contemporaneously with said primary game display, said secondary game display including a plurality of target indicia selectable by said non-reel game interaction, at least one of said target indicium associated with a secondary award, said secondary game display persisting over a series of two or more games of chance;

if said outcome triggers a non-reel game interaction, displaying said non-reel game interaction between said primary game display and said secondary game display on said gaming device;

if said non-reel game interaction results in the selection of a target indicium in said secondary game display, said gaming device issuing said secondary award, if any, associated with said selected target indicium;

revising said secondary game display at said gaming device in response to the selection of one or more target indicia; and conducting at least one subsequent game on said gaming device comprising:

displaying said secondary game display at said gaming device as displayed in a preceding game, including any revisions in said secondary game display performed in a preceding game;

randomly selecting at said gaming device the reel indicia displayed on said reels such that the reel indicia displayed on said reels produce a subsequent outcome;

if said subsequent outcome includes a display of reel indicia triggering a non-reel game interaction, displaying at said gaming device said non-reel game interaction between said primary game display and said secondary game display; and if said non-reel game interaction results in the selection of a target indicium in said secondary game display, said gaming device issuing said secondary award resulting from said selection.

26. The method of claim 25 wherein said reels form a matrix of reel indicia locations, said method further comprising defining one or more paylines at said gaming device, such that said step of receiving said wager at said gaming device includes allocating said wager to said paylines to activate one or more paylines.

27. The method of claim 26 wherein said outcome is produced by said reel indicia at said gaming device appearing along activated paylines.

28. The method of claim 25 wherein said wagers are placed at said gaming device using accumulated game credits, and wherein at least one of said secondary awards is a quantity of game credits.

29. The method of claim 25 wherein at least one of said secondary awards is at least one free spin in which said game is conducted by said gaming device without requiring receipt of a wager.

30. The method of claim 25 further comprising concealing said secondary awards at said gaming device until said target indicia resulting in awarding said secondary award, are selected.

31. The method of claim 25 further comprising:

defining a primary game schedule at said gaming device associating at least one of said outcomes with a primary award and said instructions further comprise:

after displaying said outcome at said gaming device, comparing said outcome to said primary game schedule; and issuing said associated primary award at said gaming device, if said outcome is associated with a primary award according to said primary game schedule.

32. The method of claim 25 further comprising:

connecting each target indicium to zero or more other target indicia at said gaming device; and upon the selection of a target indicium, additionally selecting target indicia at said gaming device connected to said selected target indicia.

33. The method of claim 32 wherein said connected target indicia are adjacent on said gaming device.

34. The method of claim 32 wherein each target indicium has a display attribute and said connected target indicia on said gaming device have a common display attribute.

35. The method of claim 34 wherein said target indicia are arranged such that any target indicium having, a common display attribute are connected to all adjacent indicia at said gaming device.

36. The method of claim 25 wherein said target indicia are segregated into subsets, each subset being associated with one of said reels on said gaming device.

37. The method of claim 25 further comprising:

associating at least one of said target indicia of said secondary game display at said gaming device with the trigger of a supplemental non-reel game interaction; and if said supplemental non-reel game interaction is triggered, displaying a supplemental secondary game display at said gaming device contemporaneously with said secondary game display, said supplemental secondary game display including a plurality of supplemental target indicia selectable by said supplemental non-reel game interaction, the selection of a supplemental target indicium resulting in at least one of revising said secondary game display and awarding a supplemental award.

38. A method of conducting a game of chance at a gaming device comprising:

defining a set of reel indicia within said gaming device;

receiving a wager at said gaming device;

conducting said game by said gaming device by displaying a primary game display containing a plurality of reels, each reel including reel indicia selected from said set of reel indicia, and randomly selecting the reel indicia displayed on said reels such that the reel indicia displayed on said reels produce an outcome, wherein at least one of the possible outcomes triggers a non-reel game interaction;

displaying a secondary game display on said gaming device contemporaneously with said primary game display, said secondary game display including a plurality of target indicia selectable by said non-reel game interaction, at least one of said target indicium associated with a secondary award;

if said outcome triggers a non-reel game interaction, displaying said non-reel game interaction between said primary game display and said secondary game display on said gaming device;

if said non-reel game interaction results in the selection of a target indicium in said secondary game display, said gaming device issuing said secondary award, if any, associated with said selected target indicium;

removing selected target indicia from said secondary game display at said gaming device; and replenishing said secondary game display at said gaming device by at least one of adding target indicia to said secondary game display, rearranging target indicia in said secondary game display, replacing target indicia in said secondary game display, and replacing one or more prizes associated with one or more target indicia in said secondary game display.

39. The method of claim 38 further comprising:

receiving a replenishment request at said gaming device; and initiating said replenishing in response to said replenishment request received at said gaming device.

40. The method of claim 38 further comprising:

associating at least one non-reel game interaction with said replenishing at said gaming device; and initiating said replenishing in response to an outcome triggering a non-reel game interaction associated with said replenishing at said gaming device.

41. The method of claim 40 wherein said target indicia are arranged in at least two rows with one row proximal to said primary game display at said gaming device and one row distal to said primary game display at said gaming device, and wherein a non-reel game interaction in which a target indicium in said distal row is selected is associated with said replenishing at said gaming device.

42. The method of claim 38 further comprising:

associating a replenishing with each non-reel game interaction at said gaming device, said replenishing comprising:

defining a pattern of movement in said secondary game display component at said gaming device;

removing all target indicia previously selected to produce empty target indicia locations at said gaming device;

rearranging remaining target indicia by moving target indicia into empty target indicium locations along said pattern of movement at said gaming device;

repeating said rearrangement until no target indicia remains may be moved to an empty target indicium location along said pattern of movement at said gaming device; and adding new target indicia into empty target indicia locations at said gaming device.

43. A method of conducting a game of chance at a gaming device comprising:

defining a set of reel indicia within said gaming device;

receiving a wager at said gaming device;

conducting said game by said gaming device by displaying a primary game display containing a plurality of reels, each reel including reel indicia selected from said set of reel indicia, and randomly selecting the reel indicia displayed on said reels such that the reel indicia displayed on said reels produce an outcome, wherein at least one of the possible outcomes triggers a non-reel game interaction:

displaying a secondary game display on said gaming device contemporaneously with said primary game display, said secondary game display including a plurality of target indicia selectable by said non-reel game interaction, at least one of said target indicium associated with a secondary award;

displaying a connective game display on said gaming device contemporaneous with, and distinct from, at least one of said primary game display and said secondary game display, adapted to display said non-reel game interaction between said primary game display component and said secondary game display component;

if said outcome triggers a non-reel game interaction, displaying said non-reel game interaction between said primary game display and said secondary game display at said gaming device, wherein said non-reel game interaction is depicted as a reel indicium associated with said non-reel game interaction traveling off said reels of said primary game display, traverse said connective game display, and appearing on said secondary game display; and if said non-reel game interaction results in the selection of a target indicium in said secondary game display, said gaming device issuing said secondary award, if any, associated with said selected target indicium.

44. The method of claim 43 further comprising:

moving said reels of said primary game display at said gaming device during play of a game so that said reels appear to rotate towards said secondary game display;

displaying at least one reel indicium triggering a non-reel game interaction at said gaming device as an arrow directed towards said secondary game display; and upon an outcome triggering a non-reel game interaction, displaying said non-reel game interaction at said gaming device as said arrow moving from said reel in said primary game display across said connective game display toward said target indicia in said secondary game display to strike at least one target indicium to select any target indicia struck.

45. A method of conducting a game of chance at a gaming device comprising:

defining a set of reel indicia within said gaming device;

displaying a plurality of movable reels on a primary game display at said gaming device, each reel including reel indicia selected from said set of reel indicia, said reels forming a matrix of reel indicium locations;

defining one or more paylines of reel indicia locations within said gaming device;

receiving a wager at said gaming device;

allocating said wager to said paylines to activate at least one payline at said gaming device;

conducting said game by said gaming device by displaying a primary game display containing a plurality of movable reels, each reel including reel indicia selected from said set of reel indicia, and moving said reels of said primary game display such that the reel indicia displayed along said activated paylines when said movable reels stop produce an outcome, wherein at least one of the possible outcomes triggers a non-reel game interaction;

comparing said outcome at said gaming device to a primary game schedule of outcomes and associated primary awards;

issuing at said gaming device any primary award associated with said outcome;

displaying a secondary game display at said gaming device contemporaneously with said primary game display, said secondary game display including a plurality of target indicia selectable by said non-reel game interaction, the selection of at least one target indicium associated with a secondary award;

connecting each target indicium to zero or more other target indicia at said gaming device;

if said outcome of said game includes an outcome associated with the trigger of a non-reel game interaction, conducting at said gaming device said non-reel game interaction including displaying a reel indicium traveling off said reels in said primary game display to said secondary game display to interact with said target indicia thereby selecting at least one of said target indicia;

selecting at said gaming device target indicia connected to said selected target indicia; and if said non-reel game interaction results in the selection of one or more target indicia in said secondary game display, revising said secondary game display at said gaming device and awarding a prize, if any, associated with a selected target indicia, wherein said step of revising said secondary game display comprises:

defining a pattern of movement in said secondary game display at said gaming device;

removing target indicia previously selected to produce empty target indicia locations at said gaming device:

rearranging remaining target indicia by moving any target indicia adjacent to an empty target indicium location into said empty target indicium location along said pattern of movement at said gaming device;

repeating said rearrangement until no target indicia remains adjacent to an empty target indicium location along said pattern of movement at said gaming device; and adding new target indicia into all empty target indicia locations at said gaming device.

46. A method of conducting a game of chance at a gaming device comprising:

defining a set of reel indicia within said gaming device;

displaying a plurality of movable reels on a primary game display at said gaming device, each reel including reel indicia selected from said set of red indicia, said reels forming a matrix of reel indicium locations;

defining one or more paylines of reel indicia locations within said gaming device;

receiving a wager at said gaming device;

allocating said wager to said paylines to activate at least one payline at said gaming device;

conducting said game by said gaming device by displaying a primary game display containing a plurality of movable reels, each reel including reel indicia selected from said set of reel indicia, and moving said reels of said primary game display such that the reel indicia displayed along said activated paylines when said movable reels stop produce an outcome, wherein at least one of the possible outcomes triggers a non-reel game interaction;

comparing said outcome at said gaming device to a primary game schedule of outcomes and associated primary awards;

issuing at said gaming device any primary award associated with said outcome;

displaying a secondary game display at said gaming device contemporaneously with said primary game display, said secondary game display including a plurality of target indicia selectable by said non-reel game interaction, the selection of at least one target indicium associated with a secondary award, wherein said secondary game display persists over series of two or more games;

connecting each target indicium to zero or more other target indicia at said gaming device;

if said outcome of said game includes an outcome associated with the trigger of a non-reel game interaction, conducting at said gaming device said non-reel game interaction including displaying a reel indicium traveling off said reels in said primary game display to said secondary game display to interact with said target indicia thereby selecting at least one of said target indicia;

selecting at said gaming device target indicia connected to said selected target indicia;

if said non-reel game interaction results in the selection of one or more target indicia in said secondary game display, revising said secondary game display at said gaming device and awarding a prize, if any, associated with a selected target indicia, said step of revising said secondary game display comprising removing selected target indicia from said secondary game display, and replenishing said secondary game display by at least one of adding target indicia to said secondary game display, rearranging target indicia in said secondary game display, replacing target indicia in said secondary game display; and conducting at least one subsequent game comprising:

displaying said secondary game display at said gaming device as displayed in a preceding game at said gaming device, including any revisions in said secondary game display performed in a preceding game;

moving said reels of said primary game display at said gaming device such that the reel indicia displayed when said movable reels stop produce a subsequent outcome;

if said subsequent outcome at said gaming device includes a display of reel indicia triggering a non-reel game interaction, displaying at said gaming device said non-reel game interaction between said primary game display and said secondary game display; and if said non-reel game interaction results in the selection of a target indicium in said secondary game display, said gaming device issuing said secondary award resulting from said selection.

47. A method of conducting a game of chance at a gaming device comprising:

defining a set of reel indicia within said gaming device;

displaying a plurality of movable reels on a primary game display at said gaming device, each reel including reel indicia selected from said set of reel indicia, said reels forming a matrix of reel indicium locations;

defining one or more paylines of reel indicia locations within said gaming device;

receiving a wager at said gaming device;

allocating said wager to said paylines to activate at least one payline at said gaming device;

conducting said game by said gaming device by displaying a primary game display containing a plurality of movable reels, each reel including reel indicia selected from said set of reel indicia, and moving said reels of said primary game display such that the reel indicia displayed along said activated paylines when said movable reels stop produce an outcome, wherein at least one of the possible outcomes triggers a non-reel game interaction;

comparing at said gaming device said outcome to a primary game schedule of outcomes and associated primary awards;

issuing at said gaming device any primary award associated with said outcome;

displaying a secondary game display at said gaming device contemporaneously with said primary game display, said secondary game display including a plurality of target indicia selectable by said non-reel game interaction, the selection of at least one target indicium associated with a secondary award;

connecting at said gaming device each target indicium to zero or more other target indicia;

if said outcome of said game includes an outcome associated with the trigger of a non-reel game interaction, conducting at said gaming device said non-reel game interaction including displaying a reel indicium traveling off said reels in said primary game display to said secondary game display to interact with said target indicia thereby selecting at least one of said target indicia;

selecting at said gaming device target indicia connected to said selected target indicia;

if said non-reel game interaction results in the selection of one or more target indicia in said secondary game display, revising said secondary game display at said gaming device and awarding a prize, if any, associated with a selected target indicia;

associating at least one of said target indicia of said secondary game display of said gaming device with the trigger of a supplemental non-reel game interaction; and if said supplemental non-reel game interaction is triggered, displaying a supplemental secondary game display at said gaming device contemporaneously with said secondary game display, said supplemental secondary game display including a plurality of supplemental target indicia selectable by said supplemental non-reel game interaction, the selection of a supplemental target indicium resulting in at least one of revising said supplemental secondary game display and awarding a supplemental award.

* * * * *